United States Patent
Higashiyama et al.

(10) Patent No.: US 8,863,550 B2
(45) Date of Patent: Oct. 21, 2014

(54) THERMAL STORAGE MATERIAL CONTAINER AND HEAT EXCHANGER

(75) Inventors: Naohisa Higashiyama, Oyama (JP);
Osamu Kamoshida, Oyama (JP);
Tatsuhiro Mizo, Oyama (JP)

(73) Assignee: Keihin Thermal Technology Corporation, Oyama-shi (JP)

( * ) Notice: Subject to any disclaimer, the term of this patent is extended or adjusted under 35 U.S.C. 154(b) by 216 days.

(21) Appl. No.: 13/613,454

(22) Filed: Sep. 13, 2012

(65) Prior Publication Data

US 2013/0086938 A1 Apr. 11, 2013

(30) Foreign Application Priority Data

Sep. 15, 2011 (JP) ................................. 2011-201332

(51) Int. Cl.
*F25B 39/02* (2006.01)
*F28D 20/00* (2006.01)
*F28D 1/00* (2006.01)
*B65D 6/00* (2006.01)

(52) U.S. Cl.
CPC *B65D 7/42* (2013.01); *F28D 20/00* (2013.01); *F25B 2400/24* (2013.01); *F28D 1/00* (2013.01); *F25B 39/02* (2013.01)
USPC .......................................................... 62/524

(58) Field of Classification Search
USPC .............................. 62/519, 524; 165/173, 185
See application file for complete search history.

(56) References Cited

U.S. PATENT DOCUMENTS

| | | | | |
|---|---|---|---|---|
| 5,197,538 A | * | 3/1993 | Nagasaka et al. .............. | 165/144 |
| 2008/0015598 A1 | * | 1/2008 | Prommersberger ............ | 606/75 |
| 2009/0007592 A1 | * | 1/2009 | Higashiyama .................. | 62/515 |

FOREIGN PATENT DOCUMENTS

JP 2011-012947 A 1/2011

* cited by examiner

*Primary Examiner* — Melvin Jones
(74) *Attorney, Agent, or Firm* — Edwards Wildman Palmer LLP (57) ABSTRACT

A cool storage material container is formed by brazing together peripheral edge portions of two aluminum plates. A cool storage material for storing cool is charged into a cool storage material accommodation space. The cool storage material container has a seal portion provided by closing a thermal storage material charging inlet which is formed at the peripheral edge portions of the two aluminum plates and is used to charge the cool storage material into the cool storage material accommodation space. The seal portion includes two outward protrusions which are formed by pressing and collapsing the thermal storage material charging inlet such that they project outward from the two aluminum plates and are brought into close contact with each other. The outward protrusions are bonded together by an anaerobic adhesive and are bent in the thickness direction of the aluminum plates such that their bent portions have a V-shaped cross section.

8 Claims, 6 Drawing Sheets

THERMAL STORAGE MATERIAL CONTAINER AND HEAT EXCHANGER

BACKGROUND OF THE INVENTION

The present invention relates to a thermal storage material container and a heat exchanger.

Figure 1:
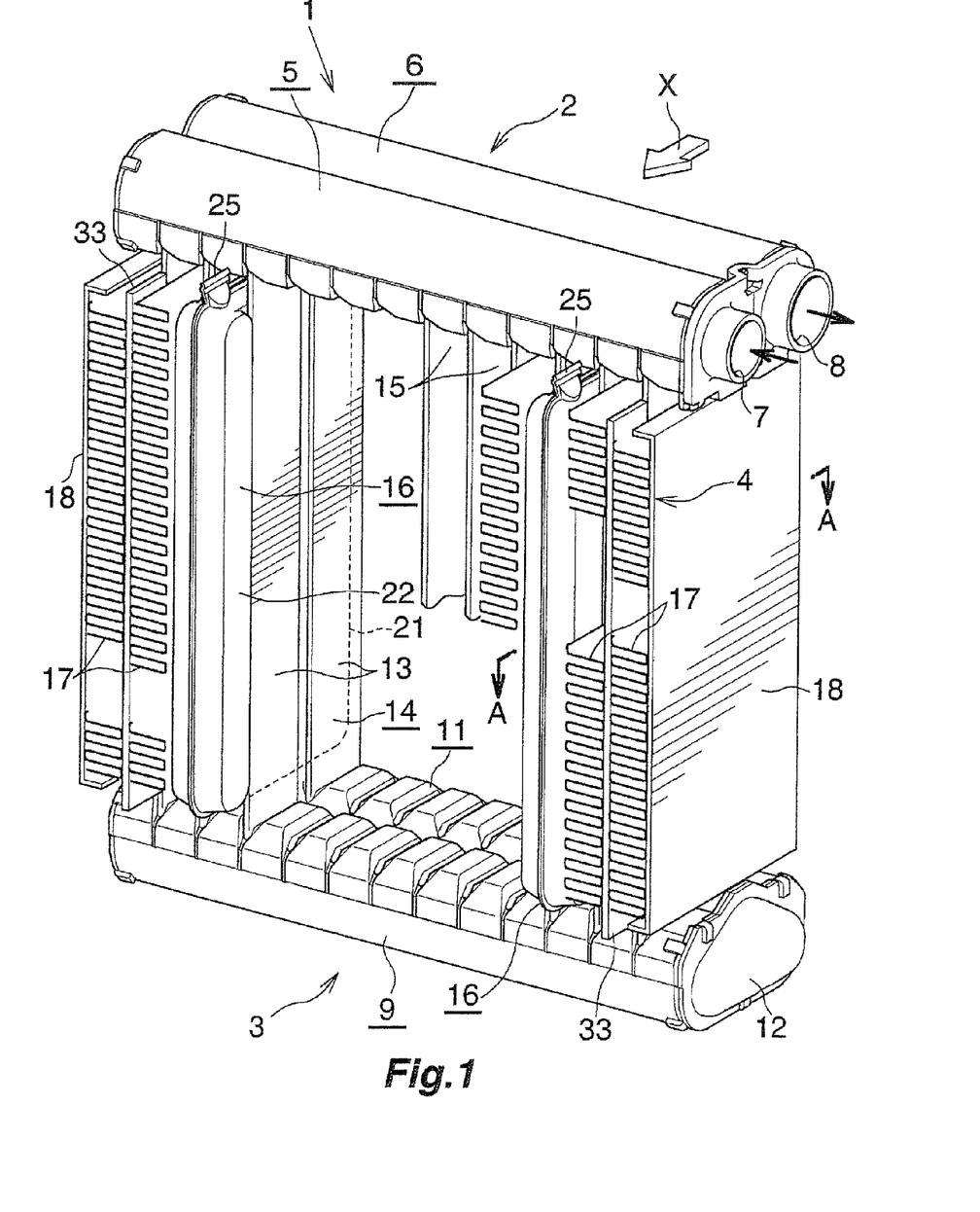
FIG. 1 is a partially cut-away perspective view showing the overall structure of an evaporator with a cool storage function in which a thermal storage material container of the present invention is used as a cool storage material container.

In the present specification and appended claims, the upper and lower sides of FIG. 1 will be referred to as "upper" and "lower," respectively.

For example, in order to protect the environment and improve fuel consumption of automobiles, there has been proposed an automobile designed to automatically stop the engine when the automobile stops, for example, so as to wait for a traffic light to change.

However, an ordinary car air conditioner has a problem in that, when an engine of an automobile in which the air conditioner is mounted is stopped, a compressor driven by the engine stops, and supply of refrigerant (medium for carrying cool) to an evaporator stops, whereby the cooling capacity of the air conditioner sharply drops.

One conceivable measure for solving such a problem is imparting a cool storage function to the evaporator, to thereby enable cooling of a vehicle compartment by releasing the cool stored in the evaporator, when the compressor stops as a result of stoppage of the engine.

Such an evaporator with a cool storage function has been proposed (see Japanese Patent Application Laid-Open (kokai) No. 2011-12947). In the proposed evaporator, a plurality of flat refrigerant flow tubes (heat exchange tubes) which extend in the vertical direction and whose width direction coincides with an air-passing direction are disposed in parallel such that they are spaced from one another. The evaporator has air-passing clearances each formed between refrigerant flow tubes located adjacent to each other. Cool storage material containers filled with a cool storage material are disposed in some air-passing clearances, and outer fins are disposed in the remaining air-passing clearances. Each cool storage material container is formed by joining together peripheral edge portions of two metal plates, and a cool storage material is charged into a cool storage material accommodation space provided between the two metal plates.

Although not clearly shown in the above-mentioned publication, a cool storage material charging inlet is formed in each cool storage material container so as to charge the cool storage material into the cool storage material container. After the cool storage material is charged into the cool storage material accommodation space through the cool storage material charging inlet, the cool storage material charging inlet must be closed.

Incidentally, in the case of the evaporator with a cool storage function disclosed in the above-mentioned publication, a conceivable simple way of forming the cool storage material charging inlet on each cool storage material container is providing an outward projecting semi-cylindrical portion at the peripheral edge of each metal plate, providing outward flanges along opposite side edges of the semi-cylindrical portion of each metal plate, and joining together the corresponding outward flanges of the semi-cylindrical portions of the two metal plates. Also, a conceivable simple way of closing such a cool storage material charging inlet is press-fitting a cylindrical columnar plug into the cool storage material charging inlet after charging of the cool storage material.

In general, the two metal plates which constitute the above-described thermal storage material container are manufactured by performing press work on a blank metal plate through use of two dies having shapes corresponding to the final shape of the metal plates. In this case, round connection portions are unavoidably formed between the inner circumferential surface of each semi-cylindrical portion and the outward flanges formed along the opposite side edges of the semi-cylindrical portion. Accordingly, when the two metal plates are joined together, recesses are formed on the inner circumferential surface of the cylindrical thermal storage material charging inlet formed by the semi-cylindrical portions of the metal plates. As a result, merely press-fitting a cylindrical columnar plug into the thermal storage material charging inlet may cause leakage of the thermal storage material.

SUMMARY OF THE INVENTION

An object of the present invention is to solve the above-mentioned problem and to provide a thermal storage material container which can reliably prevent leakage of a thermal storage material charged into the thermal storage material container and provide a heat exchanger using the thermal storage material container.

To fulfill the above object, the present invention comprises the following modes.

1) A thermal storage material container which is formed by joining together peripheral edge portions of two metal plates, the thermal storage material container having a thermal storage material accommodation space provided between the two metal plates and filled with a thermal storage material, and a seal portion provided by closing a thermal storage material charging inlet which is an outward projecting tubular portion formed at the peripheral edge portions of the two metal plates and is used to charge the thermal storage material into the thermal storage material accommodation space, wherein the seal portion includes two outward protrusions which are respectively provided on the two metal plates such that they project outward from the two metal plates and which are brought into close contact with each other; and the two outward protrusions are formed by pressing and collapsing the thermal storage material charging inlet and are bonded together by an anaerobic adhesive.

2) A thermal storage material container according to par. 1), wherein the two outward protrusions bonded by the anaerobic adhesive are bent in a thickness direction of the metal plates such that their bent portions have a V-shaped cross section.

3) A thermal storage material container according to par. 2), wherein the outward protrusions of the two metal plates bonded by the anaerobic adhesive are bent at a plurality of locations in a projection direction in which the outward protrusions project from the peripheral edge portions of the metal plates such that the bending directions of adjacent bent portions differ from each other.

4) A thermal storage material container according to par. 1), wherein the anaerobic adhesive is of a UV curable type and is hardened in a state in which a portion of the anaerobic adhesive has flowed outside from an joint interface between the two outward protrusions.

5) A heat exchanger which is used as an evaporator with a cool storage function, the heat exchanger comprising a plurality of heat exchange tubes which extend in a vertical direction and through which a medium for carrying cool flows, and a plurality of cool storage material containers filled with a cool storage material for storing cool, wherein the medium flowing through the heat exchange tubes is caused to evaporate, the cool storage material container is the thermal storage material container according to par. 1), and the heat exchanger is configured such that the cool storage material within the cool storage material container is cooled by the cool carried by the medium flowing through the heat exchange tubes.

6) A heat exchanger according to par. 5), wherein the plurality of heat exchange tubes are flat tubes whose width direction coincides with an air-passing direction; the plurality of heat exchange tubes are disposed in parallel such that they are spaced from one another; air-passing clearances are formed such that each air-passing clearance is located between adjacent heat exchange tubes; the cool storage material containers are flat containers which extend in the vertical direction and whose width direction coincides with the air-passing direction; and the cool storage material containers are disposed in some of all the air-passing clearances.

7) A heat exchanger according to par. 6), wherein the seal portion is formed at a leeward portion of each cool storage material container located on the leeward side of the heat exchange tubes.

8) A heat exchanger comprising a plurality of heat exchange tubes through which a medium for carrying heat flows, and a plurality of heat storage material containers which extend in a vertical direction and which is filled with a heat storage material for storing heat, wherein the heat storage material container is the thermal storage material container according to par. 1), and the heat exchanger is configured such that heat carried by the medium flowing through the heat exchange tubes is transferred to the heat storage material within the heat storage material container.

According to the thermal storage material container of any one of pars. 1) to 4), the seal portion includes two outward protrusions which are respectively provided on the two metal plates such that they project outward from the two metal plates and which are brought into close contact with each other; and the two outward protrusions are formed by pressing and collapsing the thermal storage material charging inlet and are bonded together by an anaerobic adhesive. Therefore, as compared with the case where a cylindrical columnar plug is merely press-fit into a cylindrical thermal storage material charging inlet, leakage of the thermal storage material charged into the thermal storage material container can be prevented reliably.

According to the thermal storage material container of par. 2) or 3), the two outward protrusions bonded by the anaerobic adhesive are bent in the thickness direction of the metal plates such that their bent portions have a V-shaped cross section. Therefore, a spring-back force generated as a result of bending the two outward protrusions acts in a direction perpendicular to the ridge line of the V-shaped portion which is the apex of the bent portion. Accordingly, the outward protrusion located on the inner side of the bent portion with respect to the bending direction is pushed against the outward protrusion located on the outer side of the bent portion with respect to the bending direction. Thus, formation of a gap between the outward protrusions of the two metal plates can be prevented reliably, and leakage of the thermal storage material charged into the thermal storage material container can be prevented more reliably.

According to the thermal storage material container of par. 3), since formation of a gap between the outward protrusions of the two metal plates can be prevented more reliably, leakage of the thermal storage material charged into the thermal storage material container can be prevented more reliably.

According to the thermal storage material container of par. 4), it is possible to visually and externally confirm that the adhesive hardened in a state in which it has flowed outside from the joint interface between the two outward protrusions covers the outer end of the joint interface. Therefore, leakage of the thermal storage material charged into the thermal storage material container can be prevented more reliably.

According to the heat exchanger of any one of pars. 5) to 7), it is possible to reliably prevent leakage of a cool storage material which is charged into a cool storage material container and which stores cool.

According to the heat exchanger of par. 8), it is possible to reliably prevent leakage of a heat storage material which is charged into a heat storage material container and which stores heat.

BRIEF DESCRIPTION OF THE DRAWINGS

FIGS. 5(*a*) and 5(*b*) are enlarged vertical sectional views showing the method of forming the seal portion of the cool storage material container used in the evaporator with a cool storage function of FIG. 1; specifically, showing a method of pressing and collapsing the cool storage material charging inlet shown in FIG. 4 and applied with an anaerobic adhesive;

FIGS. 6(*a*) and 6(*b*) are enlarged vertical sectional views showing a modification of the method of forming the seal portion of the cool storage material container used in the evaporator with a cool storage function of FIG. 1; and FIGS. 7(*a*) to 7(*c*) are enlarged vertical sectional views showing another modification of the method of forming the seal portion of the cool storage material container used in the evaporator with a cool storage function of FIG. 1.

DESCRIPTION OF THE PREFERRED EMBODIMENT

An embodiment of the present invention will next be described with reference to the drawings. In this embodiment, a thermal storage material container of the present invention is applied to cool storage material containers of an evaporator with a cool storage function into which a cool storage material for storing cool is charged.

Throughout the drawings, like portions and like members are denoted by the same reference numerals, and their descriptions will not be repeated.

In the following description, the downstream side with respect to an air-passing direction (a direction represented by arrow X in FIGS. 1 and 2) will be referred to as the "front," and the opposite side as the "rear." Also, the left-hand and right-hand sides of FIG. 1 will be referred to as "left" and "right," respectively.

Furthermore, the term "aluminum" as used in the following description encompasses aluminum alloys in addition to pure aluminum.

Figure 2:
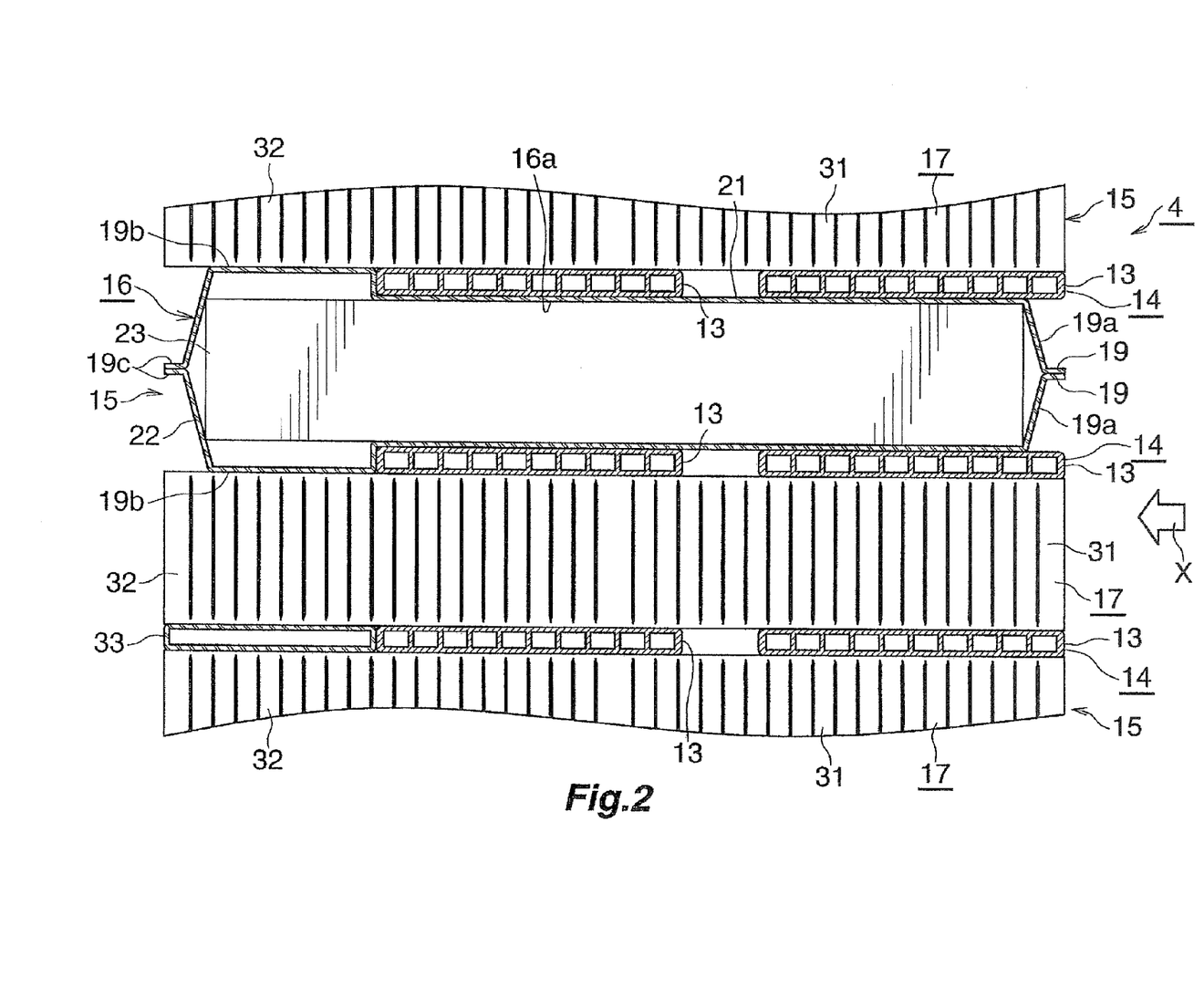
FIG. 2 is an enlarged sectional view taken along line A-A of FIG. 1.
Figure 3:
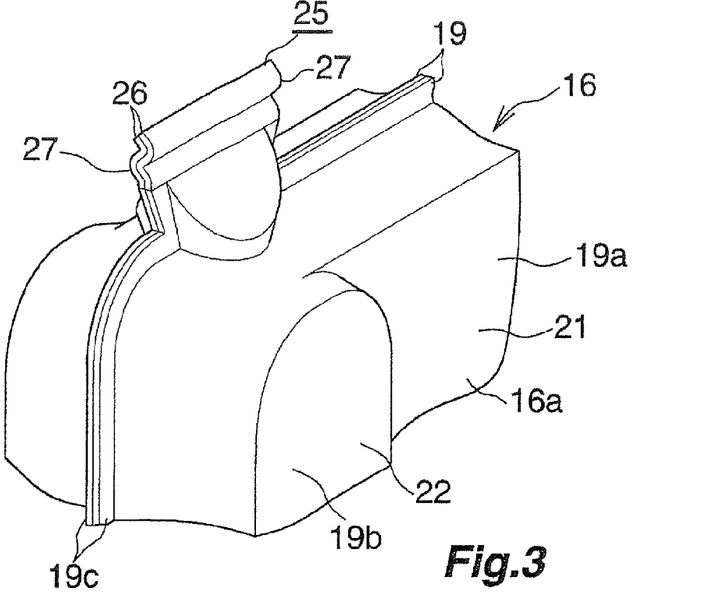
FIG. 3 is an enlarged perspective view showing a portion of the cool storage material container used in the evaporator with a cool storage function of FIG. 1.
Figure 4:
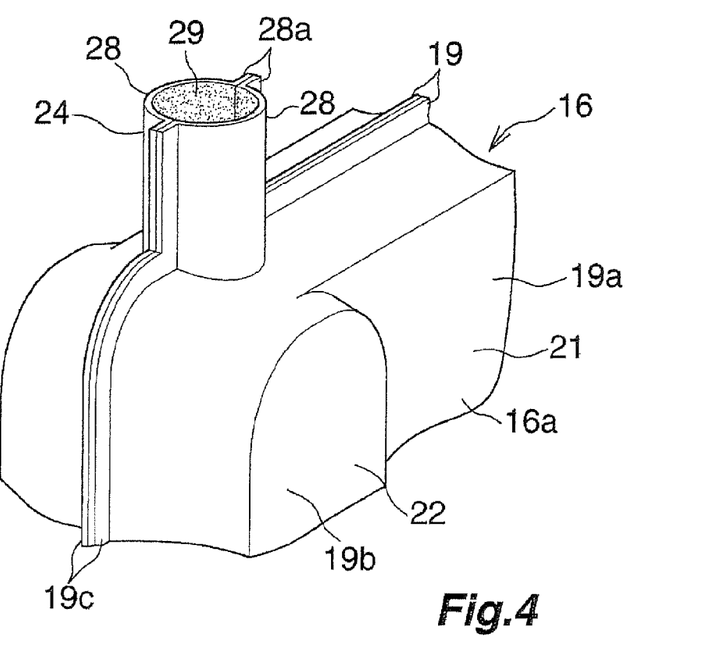
FIG. 4 is a perspective view showing a method of forming a seal portion of the cool storage material container used in the evaporator with a cool storage function of FIG. 1; specifically, showing a state after application of an anaerobic adhesive onto the inner circumferential surface of a cool storage material charging inlet.
Figure 5:
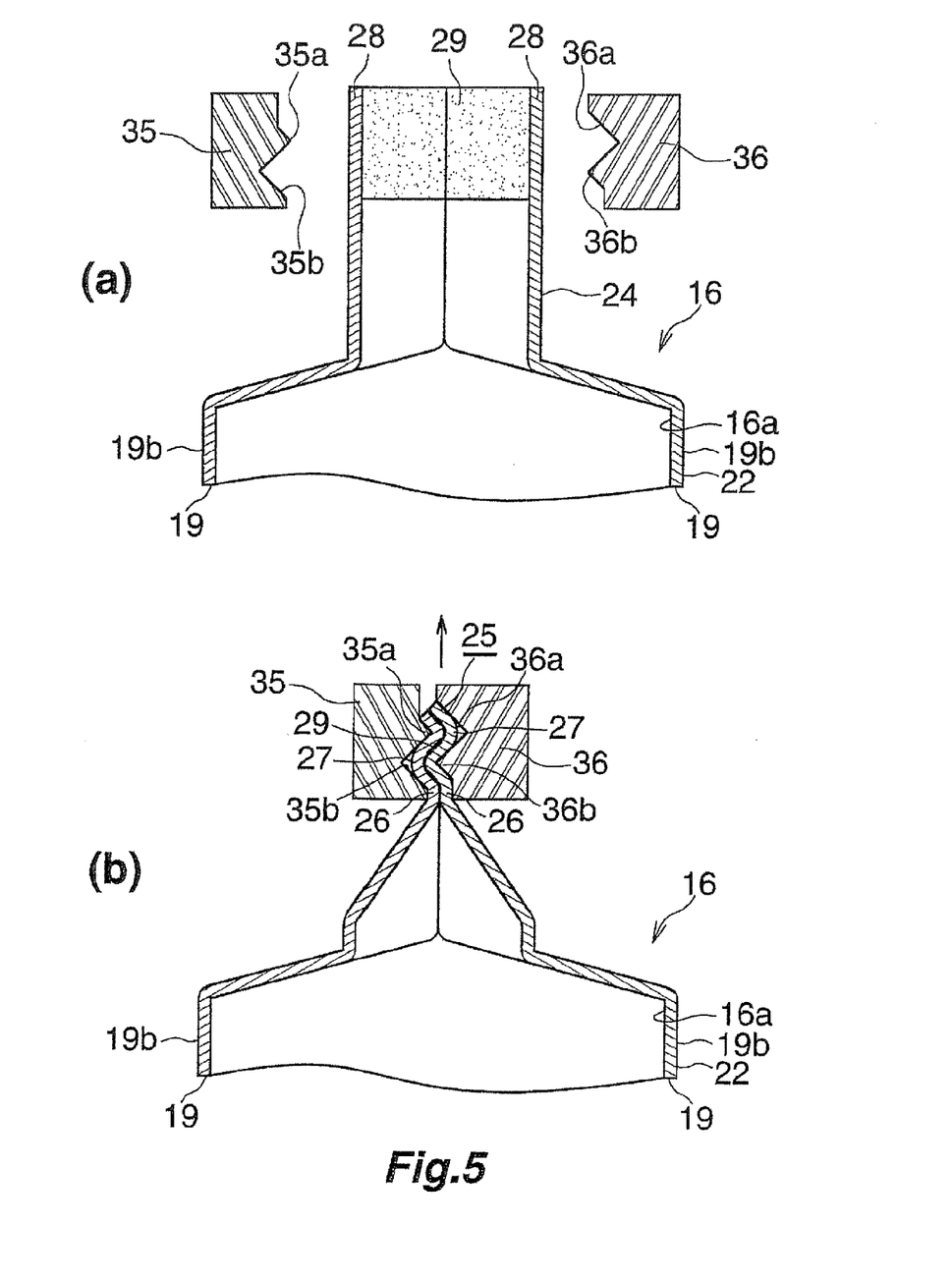

FIG. 1 shows the overall structure of an evaporator with a cool storage function in which a thermal storage material container of the present invention is used as a cool storage material container, and FIGS. 2 and 3 show the configuration of an essential portion of the evaporator. Also, FIG. 4 and FIGS. 5(a) and 5(b) show a method of forming a seal portion of a cool storage material container used in the evaporator with a cool storage function.

As shown in FIG. 1, an evaporator 1 with a cool storage function (heat exchanger) includes a first header tank 2 and a second header tank 3 formed of aluminum and disposed apart from each other in the vertical direction such that they extend in the left-right direction; and a heat exchange core section 4 provided between the two header tanks 2 and 3.

The first header tank 2 includes a leeward upper header section 5 located on the front side (downstream side with respect to the air-passing direction); and a windward upper header section 6 located on the rear side (upstream side with respect to the air-passing direction) and united with the leeward upper header section 5. A refrigerant inlet 7 is provided at the right end of the leeward upper header section 5, and a refrigerant outlet 8 is provided at the right end of the windward upper header section 6. The second header tank 3 includes a leeward lower header section 9 located on the front side, and a windward lower header section 11 located on the rear side and united with the leeward lower header section 9. The respective interiors of the leeward lower header section 9 and the windward lower header section 11 of the second header tank 3 are connected together via a communication member 12 which is joined to the right ends of the two lower header sections 9 and 11 and which has an inner space serving as a passage.

As shown in FIGS. 1 and 2, in the heat exchange core section 4, a plurality of flat heat exchange tubes 13 which extend in the vertical direction, whose width direction coincides with the air-passing direction (the front-rear direction), and which are formed of aluminum extrudate are disposed in parallel such that they are spaced from one another in the left-right direction. In the present embodiment, a plurality of pairs 14 each composed of two heat exchange tubes 13 spaced from each other in the front-rear direction are disposed at predetermined intervals in the left-right direction. Air-passing clearances 15 are formed such that each air-passing clearance 15 is formed between adjacent two of the pairs 14 each composed of the front and rear heat exchange tubes 13. An upper end portion of each front heat exchange tube 13 is connected to the leeward upper header section 5, and a lower end portion of each front heat exchange tube 13 is connected to the leeward lower header section 9. Similarly, an upper end portion of each rear heat exchange tube 13 is connected to the windward upper header section 6, and a lower end portion of each rear heat exchange tube 13 is connected to the windward lower header section 11.

A cool storage material container 16 (thermal storage material container) which is formed of aluminum and which is filled with a cool storage material (not shown) for storing cool is disposed in each of air-passing clearances 15 selected from all the air-passing clearances 15 of the heat exchange core section 4, the selected air-passing clearances 15 being not adjacent from one another, such that the cool storage material container 16 extends over the front and rear heat exchange tubes 13. Also, a corrugated outer fin 17 is disposed in each of the remaining air-passing clearances 15 such that the corrugated outer fin 17 extends over the front and rear heat exchange tubes 13. The outer fin 17 is formed from an aluminum brazing sheet having a brazing material layer on each of opposite surfaces thereof and which has crest portions extending in the front-rear direction, trough portions extending in the front-rear direction, and connection portions connecting the crest portions and the trough portions. The outer fin 17 is brazed to the front and rear heat exchange tubes 13 of the left-side and right-side pairs 14 which define the air-passing clearance 15. That is, the outer fin 17 is disposed in each of the air-passing clearances 15 located on opposite sides of the air-passing clearance 15 in which the cool storage material container 16 is disposed. Also, the outer fin 17, which is formed from an aluminum brazing sheet having a brazing material layer on each of opposite surfaces thereof, is disposed on the outer side of the pair 14 of the heat exchange tubes 13 located at the left end, and is disposed on the outer side of the pair 14 of the heat exchange tubes 13 located at the right end. These outer fins 17 are brazed to the corresponding front and rear heat exchange tubes 13. Furthermore, a side plate 18 formed of aluminum is disposed on the outer side of each of the outer fins 17 located at the left and right ends, respectively, and is brazed to the corresponding outer fin 17. The spaces between the outer fins 17 and the side plates 18 located at the left and right ends also serve as air-passing clearances.

As shown in FIG. 2, each cool storage material container 16 is a flat container whose width direction coincides with the front-rear direction, and is formed by brazing together peripheral edge portions of two generally rectangular aluminum plates 19 (meal plates) extending vertically. A cool storage material is charged into a cool storage material accommodation space 16a (thermal storage material accommodation space) provided between the two aluminum plates 19. Each cool storage material container 16 has a container main body portion 21 and an outward projecting portion 22. The container main body portion 21 is located rearward of the front side edges of the front heat exchange tubes 13, and is brazed to the two (front and rear) heat exchange tubes 13 of each of the pairs 14 located on opposite sides of the container main body portion 21. The outward projecting portion 22 extends from the front side edge (leeward side edge) of the container main body portion 21, and projects frontward (outward in the air-passing direction) from the front side edges of the front heat exchange tubes 13. The interiors of the container main body portion 21 and the outward projecting portion 22 serve as the cool storage material accommodation space 16a. The entire container main body portion 21 of the cool storage material container 16 has a uniform dimension as measured in the left-right direction. The dimension of the outward projecting portion 22 of the cool storage material container 16 as measured in the vertical direction is equal to that of the container main body portion 21, and the dimension of the outward projecting portion 22 of the cool storage material container 16 as measured in the left-right direction is greater than that of the container main body portion 21 of the cool storage material container 16. Therefore, in relation to the container main body portion 21, the outward projecting portion 22 bulges outward in the left-right direction. The dimension of the outward projecting portion 22 as measured in the left-right direction is equal to a height obtained by adding the dimension of the container main body portion 21 of the cool storage material container 16 in the left-right direction to the double of a tube height, which is the dimension of each heat exchange tube 13 as measured in the left-right direction.

An inner fin 23 made of aluminum is disposed in each cool storage material container 16 such that the inner fin 23 extends from the rear end of the container main body portion 21 to the front end of the outward projecting portion 22 and extends over substantially the entire length of the cool storage material container 16 in the vertical direction. The inner fin 23 is a corrugated fin which has crest portions extending in the front-rear direction, trough portions extending in the front-rear direction, and connection portions connecting the crest portions and the trough portions. The inner fin 23 has a uniform fin height over the entirety thereof, and is brazed to the inner surfaces of the left and right side walls of the container main body portion 21 of the storage material container 16.

A paraffin-based latent heat storage material having an adjusted freezing point of about 5 to 10° C. is used as a cool storage material charged into each cool storage material container 16. Specifically, pentadecane, tetradecane, or the like is used. The cool storage material is charged into each cool storage material container 16 such that the cool storage material reaches a point near the upper end of the cool storage material container 16. Notably, the cool storage material container 16 is designed to have a sufficient strength within a usual temperature range of an environment in which the cooling unit is used; for example, a temperature range of −40° C. to 90° C., such that, even when the internal pressure increases due to density change of the cool storage material in a liquid phase and thermal expansion of air remaining within the cool storage material container 16, the cool storage material container 16 does not break.

The aluminum plates 19, which constitute each cool storage material container 16, are each formed, through press work, from an aluminum brazing sheet having a brazing material layer on each of opposite sides thereof. Each of the aluminum plates 19 has bulge portions 19a and 19b, which form the container main body portion 21 and the outward projecting portion 22, respectively, and a rim portion 19c which remains along the peripheral edge and has a predetermined width. The two aluminum plates 19 are assembled together with the inner fin 23 disposed therebetween such that the openings of the bulge portions 19a and 19b face each other. In this state, the rim portions 19c of the two aluminum plates 19 are brazed together, and the inner fin 23 is brazed to the aluminum plates 19, whereby the cool storage material container 16 is formed.

As shown in FIG. 3, an upward projecting seal portion 25 is provided at the upper end of the outward projecting portion 22 of each cool storage material container 16. The seal portion 25 is formed by closing a cool storage material charging inlet 24 (thermal storage material charging inlet; see FIG. 4 and FIG. 5(a)) which is formed at the peripheral edges of the two aluminum plates 19 and which has been used for charging a cool storage material into the cool storage material accommodation space 16a. The seal portion 25 include two outward protrusions 26 which are provided on the aluminum plates 19 such that they project upward therefrom and which are brought into close contact with each other. The two outward protrusions 26 are formed by pressing and collapsing the cool storage material charging inlet 24 from the outside with respect to the thickness direction of the cool storage material container 16. The two outward protrusions 26 are bonded together through use of an anaerobic adhesive 29 (see FIG. 5(b); not shown in FIG. 3).

At a plurality of locations (two locations in the present embodiment) spaced from each other in the vertical direction; i.e., in the direction in which the outward protrusions 26 project from the peripheral edges of the aluminum plates 19, the two outward protrusions 26 of the seal portion 25 bonded together by the anaerobic adhesive 29 are bent in the thickness direction of the aluminum plates 19 such that each bent portion 27 has a V-shaped cross section. The adjacent bent portions 27 differ in bending direction. For example, LOC-TITE 638 (product of Henkel Corporation) is used as the anaerobic adhesive 29. In this case, a stable gastightness and bonding strength can be secured in a temperature range of −40° C. to 90° C., which is the usual temperature range of an environment in which the evaporator 1 is used.

Each outer fin 17 is a corrugated fin which has crest portions extending in the front-rear direction, trough portions extending in the front-rear direction, and connection portions connecting the crest portions and the trough portions. Each other fin 17 has a fin main body portion 31 and an outward projecting portion 32. The fin main body portion 31 is located rearward of the front side edges of the front heat exchange tubes 13, and is brazed to the front and rear heat exchange tubes 13 of each of the pairs 14 located on opposite sides of the fin main body portion 31. The outward projecting portion 32 extends from the front side edge of the fin main body portion 31, and projects frontward from the front side edges of the front heat exchange tubes 13. The outward projecting portions 32 of the outer fins 17 disposed in the air-passing clearances 15 adjacently located on the opposite sides of the air-passing clearances 15 in which the cool storage material container 16 is disposed are brazed to the left and right side surfaces of the outward projecting portion 22 of the cool storage material container 16. Also, a spacer 33 formed of aluminum is disposed between the outward projecting portions 32 of the adjacent outer fins 17, and is brazed to the outward projecting portions 32.

The seal portion 25 of each cool storage material container 16 is provided as follows.

Semi-cylindrical portions 28 for forming the charging inlet are previously provided at the upper ends of the bulge portions 19b (which constitute the outward projecting portion 22) of the two aluminum plates 19, which form the cool storage material container 16. Outward extending flanges 28a are integrally formed along opposite side edges of each semi-cylindrical portion 28. The flanges 28a are continuous with the rim portion 19c of the corresponding aluminum plate 19. The cool storage material container 16 is manufactured in the above-described manner through use of such aluminum plates 19, whereby the cool storage material charging inlet 24 is formed. As shown in FIGS. 4 and 5(a), the cool storage material charging inlet 24 is provided such that it projects upward from the upper end of the outward projecting portion 22. The cool storage material charging inlet 24, which has a cylindrical tubular shape, is opened at its lower end to the interior of the outward projecting portion 22, which partially forms the cool storage material accommodation space 16a of the cool storage material container 16, and is opened at its upper end to the outside of the cool storage material container 16. Notably, manufacture of the cool storage material container 16 may be performed simultaneously with brazing of the remaining components of the evaporator 1, or performed separately from the brazing. In the case where manufacture of the cool storage material container 16 is performed separately from the brazing of the remaining components of the evaporator 1, after manufacture of the cool storage material container 16, the cool storage material container 16 is disposed at a predetermined position of the evaporator.

Subsequently, after the cool storage material is charged into the cool storage material container 16 through the cool storage material charging inlet 24, the anaerobic adhesive 29 is applied onto the inner circumferential surface of the cool storage material charging inlet 24 (see FIGS. 4 and 5(a)). Subsequently, through use of a left die 35 and a right die 36, the cool storage material charging inlet 24 is pressed and collapsed from the opposite sides with respect to the thickness direction of the aluminum plates 19, to thereby form the outward protrusions 26 which are in close contact with each other. The left die 35 has a rightward projecting convex portion 35a and a leftward recessing concave portion 35b which are arranged in the vertical direction. The right die 36 has a rightward recessing concave portion 36a and a leftward projecting convex portion 36b which are arranged in the vertical direction and which correspond to the convex portion 35a and the concave portion 35b, respectively, of the left die 35. Therefore, the convex portion 35a and concave portion 35b of the left die 35 and the concave portion 36a and convex portion 36b of the right die 36 bent the two outward protrusions 26 in the thickness direction of the aluminum plates 19 such that each bent portion has a V-shaped cross section. As a result, the two outward protrusions 26 are bent at two locations spaced from each other in the vertical direction such that the adjacent bent portions 27 differ in bending direction (see FIG. 5(b)). After that, the two outward protrusions 26 are left as they are for a predetermined period of time, whereby the two outward protrusions 26 are bonded together by the anaerobic adhesive 29. Thus, the seal portion 25 is provided.

The above-described evaporator 1 with a cool storage function constitutes a refrigeration cycle in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. The refrigeration cycle is installed, as a car air conditioner, in a vehicle, such as an automobile, which temporarily stops the engine, which serves as a drive source of the compressor, when the vehicle is stopped. When the compressor is operating, low pressure, two-phase refrigerant (a mixture of vapor refrigerant and liquid refrigerant) having been compressed by the compressor and having passed through the condenser and the expansion valve passes through the refrigerant inlet 7, and enters the leeward upper header section 5 of the evaporator 1. The refrigerant then passes through all the heat exchange tubes 13, and flows out from the refrigerant outlet 8 of the windward upper header section 6. When the refrigerant flows through the heat exchange tubes 13, the refrigerant performs heat exchange with air passing through the air-passing clearances 15, and flows out in a vapor phase.

At that time, the cool storage material within the container main body 21 of each cool storage material container 16 is cooled by the cool carried by the refrigerant flowing through the heat exchange tubes 13. Further, the cool carried by the cooled cool storage material within the container main body 21 is transferred through the inner fin 23 to the cool storage material within the outward projecting portion 22 of the cool storage material container 16, and the cool carried by air having passed through the air-passing clearances 15 and cooled by the refrigerant is transferred to the cool storage material within the outward projecting portion 22. As a result, the cool is stored in the entire cool storage material within the cool storage material container 16.

When the compressor stops, the cool stored in the cool storage material within the container main body portion 21 and outward projecting portion 22 of each cool storage material container 16 is transferred, through the inner fin 23, to the left and right side walls of the container main body portion 21 and the outward projecting portion 22. The cool transferred to the left and right side walls of the container main body portion 21 passes through the corresponding heat exchange tubes 13, and is transferred, via the fin main body portions 31 of the outer fins 17 brazed to the heat exchange tubes 13, to air passing through the air-passing clearances 15 adjacently located on the opposite sides of the air-passing clearance 15 in which the cool storage material container 16 is disposed. The cool transferred to the left and right side walls of the outward projecting portion 22 is transferred, via the outward projection portions 32 of the outer fins 17 brazed to the left and right side surfaces of the outward projecting portion 22, to air passing through the air-passing clearances 15. Accordingly, even when the temperature of air having passed through the evaporator 1 increases, the air is cooled, so that a sharp drop in the cooling capacity can be prevented.

FIGS. 6(a) and 6(b) and FIGS. 7(a) to 7(c) show modifications of the seal portion provided on each cool storage material container 16 and modifications of the method of providing the seal portion.

Figure 6:
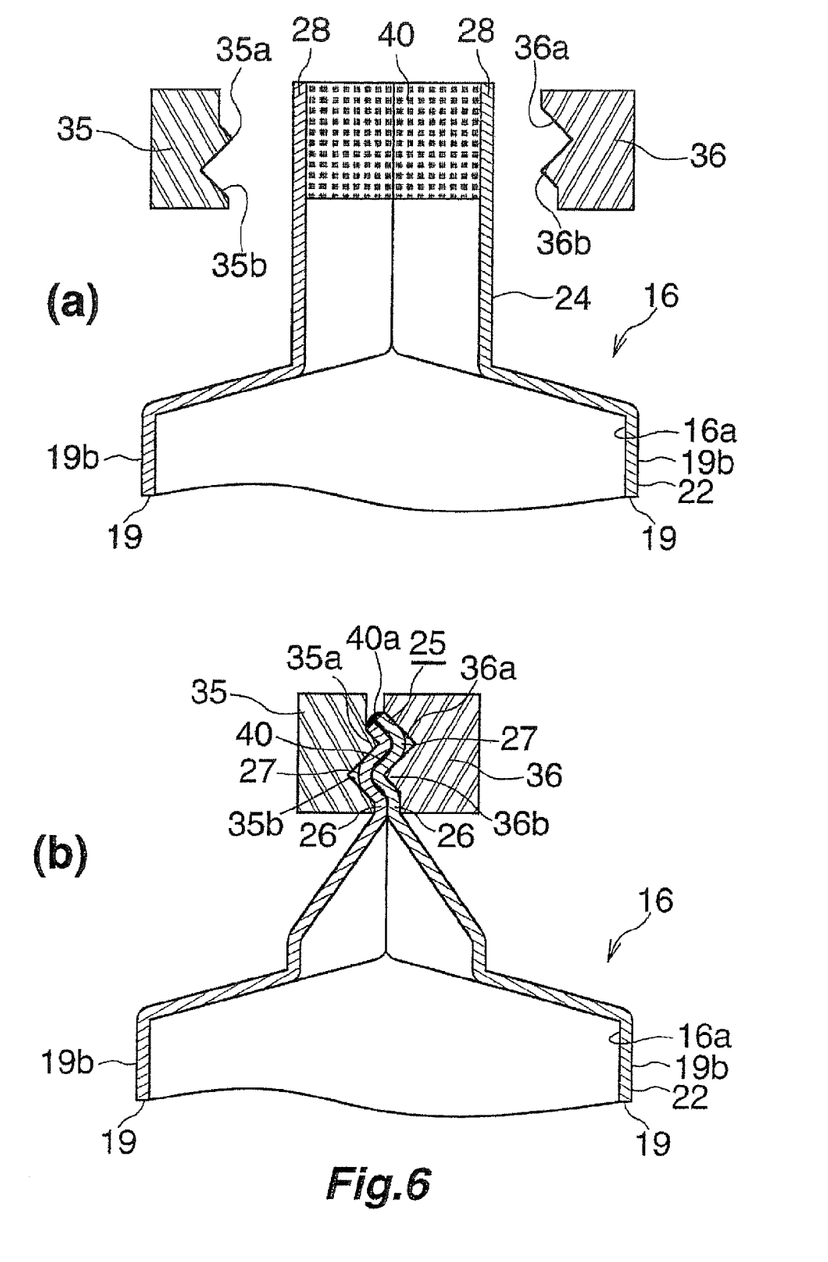

In the case of the seal portion 25 of the cool storage material container 16 shown in FIGS. 6(a) and 6(b), the two outward protrusions 26 are bonded together by an UV curable anaerobic adhesive 40. The UV curable anaerobic adhesive 40 is hardened in a state in which a portion of the UV curable anaerobic adhesive 40 has flowed outside from the joint interface between the two outward protrusions 26 and has covered the outer end of the joint interface (see FIG. 6(b)). The portion of the UV curable anaerobic adhesive 40 having flowed outside from the joint interface between the two outward protrusions 26 is denoted by 40a. For example, LOCTITE 638UV (product of Henkel Corporation) is used as the UV curable anaerobic adhesive 40. In this case, a stable gastightness and bonding strength can be secured in a temperature range of −40° C. to 90° C., which is the usual temperature range of an environment in which the evaporator 1 is used.

The seal portion 25 of each cool storage material container 16, in which the UV curable anaerobic adhesive 40 is used, is provided in the same manner as the seal portion 25 in which the anaerobic adhesive 29 is used, except that the UV curable anaerobic adhesive 40 is applied in place of the anaerobic adhesive 29.

However, the application amount of the UV curable anaerobic adhesive 40 is determined such that, when the cool storage material charging inlet 24 is pressed and collapsed, through use of the left die 35 and the right die 36, from the opposite sides with respect to the thickness direction of the aluminum plates 19, a portion of the UV curable anaerobic adhesive 40 flows outside from the joint interface between the two outward protrusions 26 and covers the outer end of the joint interface.

The amount $Z$ (mm$^3$) of the UV curable anaerobic adhesive 40 applied onto the inner circumferential surface of the cool storage material charging inlet 24 is preferably determined in accordance with the following expression:

$$Z = L1 \times L2 \times L3$$

where L1 (mm) is the inner circumferential length of the cool storage material charging inlet 24, L2 (mm) is the length (measured in the vertical direction) of a portion of the inner circumferential surface of the cool storage material charging inlet 24, on which portion the UV curable anaerobic adhesive 40 is applied, and L3 (mm) is the spacing between the two outward protrusions 26 after the cool storage material charging inlet 24 is pressed and collapsed.

Finally, a UV light ray is applied to the adhesive and is allowed to stand for a predetermined period of time, whereby the two outward protrusions 26 are bonded together by the UV curable anaerobic adhesive 40, and a squeezed-out, hardened portion 40a is formed. Thus, the seal portion 25 is provided.

Figure 7:
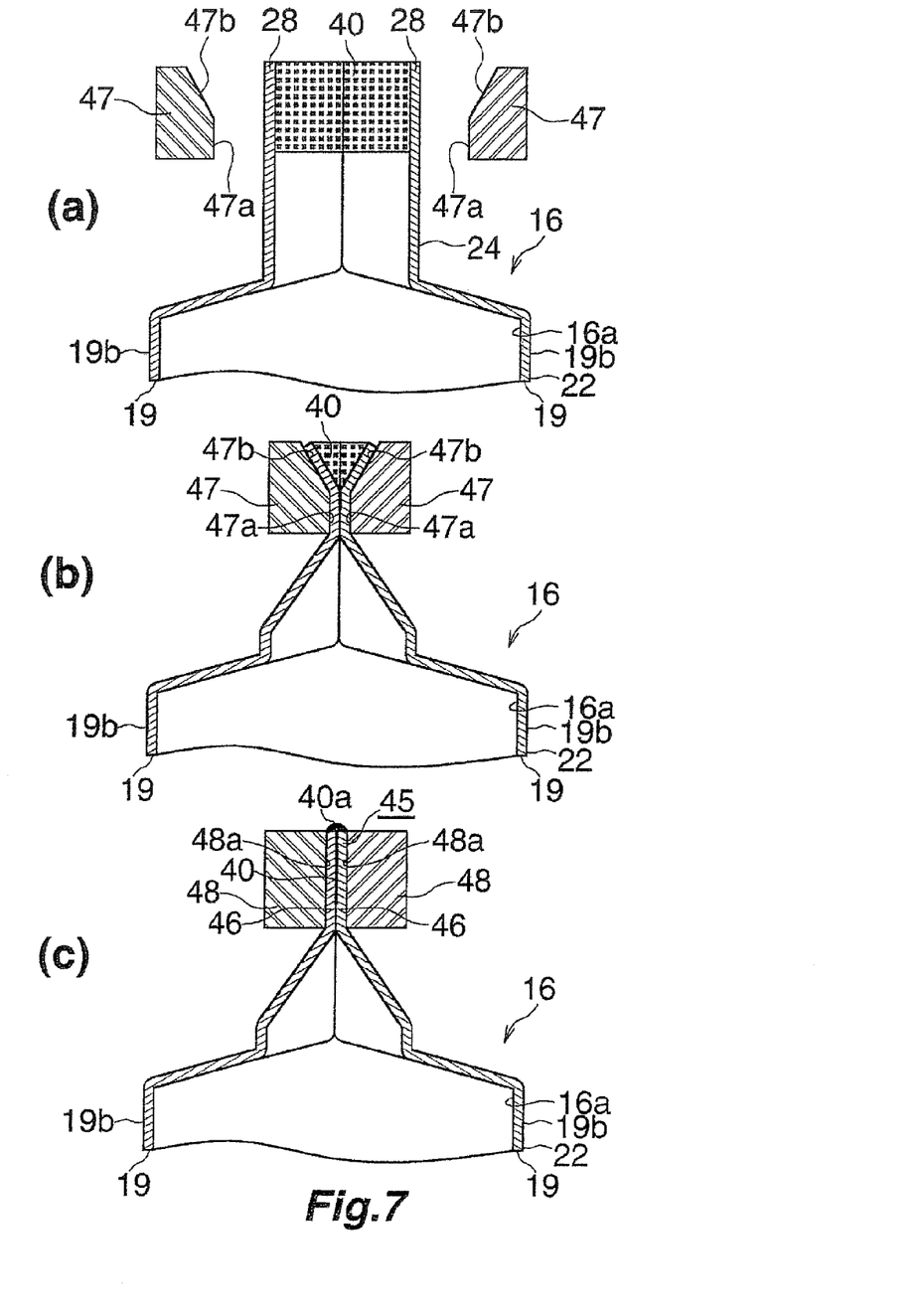

A seal portion 45 of the cool storage material container 16 shown in FIGS. 7(a) to 7(c) includes two outward protrusions 46 which are provided on the aluminum plates 19 such that they project upward therefrom and which are brought into close contact with each other. The two outward protrusions 46 are formed by pressing and collapsing the cool storage material charging inlet 24 from the outside with respect to the thickness direction of the cool storage material container 16 such that the entire outward protrusions 46 become flat. The two outward protrusion 46 are bonded tighter by a UV curable anaerobic adhesive 40. The UV curable anaerobic adhesive 40 is hardened in a state in which a portion of the UV curable anaerobic adhesive 40 has flowed outside from the joint interface between the two outward protrusions 46 and has covered the outer end of the joint interface (see FIG. 7(c)). The portion of the UV curable anaerobic adhesive 40 having flowed outside from the joint interface is denoted by 40a.

The seal portion 45 of the cool storage material container 16 is provided as follows.

The method of providing the seal portion 45 is the same as the case of the seal portion 25 in which the above-described anaerobic adhesive 29 is used, up to the manufacture of the cool storage material container 16 having the cool storage material charging inlet 24. After the cool storage material is charged into the cool storage material container 16 through the cool storage material charging inlet 24, the UV curable anaerobic adhesive 40 is applied onto the inner circumferential surface of the cool storage material charging inlet 24 (see FIG. 7(a)). Subsequently, the cool storage material charging inlet 24 is pressed and collapsed, through use of first left and right dies 47, from the opposite sides with respect to the thickness direction of the aluminum plates 19. Each of mutually facing portions of the left and right dies 47 has a vertical surface 47a, and a slant surface 47b which extends upward from the upper end of the vertical surface 47a and inclines outward in the left-right direction. The left and right dies 47 deform upper portions (deformation portions) of the semi-cylindrical portions 28 of the cool storage material charging inlet 24. Specifically, lower parts of the deformation portions of the semi-cylindrical portions 28 are collapsed and pressed against each other by the vertical surfaces 47a, and upper parts of the deformation portions are deformed to extend along the slant surfaces 47b of the left and right dies 47. A portion of the UV curable anaerobic adhesive 40 accumulates in a region between the portions of the semi-cylindrical portions 28 extending along the slant surfaces 47b of the left and right dies 47 (see FIG. 7(b)).

Subsequently, the entire semi-cylindrical portions 28 of the cool storage material charging inlet 24 are pressed and collapsed by second left and right dies 48. The left and right dies 48 have vertical surfaces 48a formed over the entireties of the mutually facing portions thereof. The vertical surfaces 48a of the left and right dies 48 form the flat outward protrusions 46 and brings the two outward protrusion 46 into close contact with each other. At that time, the UV curable anaerobic adhesive 40 is caused to partially flow out of the joint interface between the two outward protrusions 46 and cover the outer end of the joint interface. After that, a UV light ray is applied to the adhesive and is allowed to stand for a predetermined period of time, whereby the two outward protrusions 46 are bonded together by the UV curable anaerobic adhesive 40. Thus, the seal portion 45 is provided.

The amount Z (mm$^3$) of the UV curable anaerobic adhesive 40 applied onto the inner circumferential surface of the cool storage material charging inlet 24 is preferably determined in accordance with the following expression:

$$Z = L1 \times L2 \times L3$$

where L1 (mm) is the inner circumferential length of the cool storage material charging inlet 24, L2 (mm) is the length (measured in the vertical direction) of a portion of the inner circumferential surface of the cool storage material charging inlet 24, on which portion the UV curable anaerobic adhesive 40 is applied, and L3 (mm) is the spacing between the two outward protrusions 46 after the cool storage material charging inlet 24 is pressed and collapsed.

In the above-described embodiment, the thermal storage material container according to the present invention is used as a cool storage material container of an evaporator having a cool storage function into which a cool storage material for storing cool is charged. However, the present invention is not limited thereto. In a heat exchanger having a plurality of heat exchange tubes through which a medium for carrying heat flows, the thermal storage material container according to the present invention may be used as a heat storage material container into which a heat storage material for storing heat is charged.

What is claimed is:

1. A thermal storage material container which is formed by joining together peripheral edge portions of two metal plates, the thermal storage material container having a thermal storage material accommodation space provided between the two metal plates and filled with a thermal storage material, and a seal portion provided by closing a thermal storage material charging inlet which is an outward projecting tubular portion formed at the peripheral edge portions of the two metal plates and is used to charge the thermal storage material into the thermal storage material accommodation space, wherein
the seal portion includes two outward protrusions which are respectively provided on the two metal plates such that they project outward from the two metal plates and which are brought into close contact with each other; and the two outward protrusions are formed by pressing and collapsing the thermal storage material charging inlet and are bonded together by an anaerobic adhesive.

2. A thermal storage material container according to claim 1, wherein the two outward protrusions bonded by the anaerobic adhesive are bent in a thickness direction of the metal plates such that their bent portions have a V-shaped cross section.

3. A thermal storage material container according to claim 2, wherein the outward protrusions of the two metal plates bonded by the anaerobic adhesive are bent at a plurality of locations in a projection direction in which the outward protrusions project from the peripheral edge portions of the metal plates such that the bending directions of adjacent bent portions differ from each other.

4. A thermal storage material container according to claim 1, wherein the anaerobic adhesive is of a UV curable type and is hardened in a state in which a portion of the anaerobic adhesive has flowed outside from an joint interface between the two outward protrusions.

5. A heat exchanger which is used as an evaporator with a cool storage function, the heat exchanger comprising a plurality of heat exchange tubes which extend in a vertical direction and through which a medium for carrying cool flows, and a plurality of cool storage material containers filled with a cool storage material for storing cool, wherein the medium flowing through the heat exchange tubes is caused to evaporate, the cool storage material container is the thermal storage material container according to claim 1, and the heat exchanger is configured such that the cool storage material within the cool storage material container is cooled by the cool carried by the medium flowing through the heat exchange tubes.

6. A heat exchanger according to claim 5, wherein the plurality of heat exchange tubes are flat tubes whose width direction coincides with an air-passing direction; the plurality of heat exchange tubes are disposed in parallel such that they are spaced from one another; air-passing clearances are formed such that each air-passing clearance is located between adjacent heat exchange tubes; the cool storage material containers are flat containers which extend in the vertical direction and whose width direction coincides with the air-passing direction; and the cool storage material containers are disposed in some of all the air-passing clearances.

7. A heat exchanger according to claim 6, wherein the seal portion is formed at a leeward portion of each cool storage material container located on the leeward side of the heat exchange tubes.

8. A heat exchanger comprising a plurality of heat exchange tubes through which a medium for carrying heat flows, and a plurality of heat storage material containers which extend in a vertical direction and which is filled with a heat storage material for storing heat, wherein the heat storage material container is the thermal storage material container according to claim 1, and the heat exchanger is configured such that heat carried by the medium flowing through the heat exchange tubes is transferred to the heat storage material within the heat storage material container.

* * * * *